(12) United States Patent
Minemura et al.

(10) Patent No.: US 9,163,121 B2
(45) Date of Patent: Oct. 20, 2015

(54) POLYCARBONATE AND POLYSILOXANE BLOCK COPOLYMER AND FLAME RETARDANT RESIN COMPOSITION

(71) Applicant: SHIN-ETSU CHEMICAL CO., LTD., Tokyo (JP)

(72) Inventors: Masahiko Minemura, Annaka (JP); Mitsuhiro Takarada, Takasaki (JP); Masaki Tanaka, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 84 days.

(21) Appl. No.: 13/791,280

(22) Filed: Mar. 8, 2013

(65) Prior Publication Data

US 2013/0261235 A1 Oct. 3, 2013

(30) Foreign Application Priority Data

Mar. 30, 2012 (JP) .................................. 2012-81325

(51) Int. Cl.
*C08G 77/42* (2006.01)
*C08G 77/448* (2006.01)
*C08L 69/00* (2006.01)
*C08L 83/10* (2006.01)
*C08G 64/18* (2006.01)
*C08K 3/00* (2006.01)
*C09K 21/06* (2006.01)
*C09K 21/08* (2006.01)
*C09K 21/12* (2006.01)

(52) U.S. Cl.
CPC .............. *C08G 77/42* (2013.01); *C08G 64/186* (2013.01); *C08G 77/448* (2013.01); *C08L 69/00* (2013.01); *C08L 83/10* (2013.01); *C08K 3/0058* (2013.01); *C09K 21/06* (2013.01); *C09K 21/08* (2013.01); *C09K 21/12* (2013.01)

(58) Field of Classification Search
CPC .... C08G 77/448; C08G 64/186; C08L 83/10; C08L 69/10; C08K 5/0066; C08K 5/49
USPC .............. 524/116, 161, 505; 525/101; 528/25
See application file for complete search history.

(56) References Cited

U.S. PATENT DOCUMENTS

| | | | | |
|---|---|---|---|---|
| 4,161,498 A | * | 7/1979 | Bopp | 525/439 |
| 4,788,252 A | * | 11/1988 | de Boer et al. | 525/67 |
| 5,026,791 A | * | 6/1991 | Hawkins et al. | 525/464 |
| 5,034,458 A | * | 7/1991 | Serini et al. | 525/67 |
| 7,553,895 B2 | * | 6/2009 | An et al. | 524/162 |
| 2003/0158309 A1 | | 8/2003 | Ono et al. | |
| 2007/0185280 A1 | * | 8/2007 | Luther | 525/356 |

FOREIGN PATENT DOCUMENTS

| | | |
|---|---|---|
| EP | 0 426 958 A2 | 5/1991 |
| EP | 0 524 731 A1 | 1/1993 |
| JP | A-6-100684 | 4/1994 |
| JP | A-6-298922 | 10/1994 |
| JP | A-6-336521 | 12/1994 |
| JP | B2-8-32820 | 3/1996 |
| JP | A-11-279274 | 10/1999 |
| JP | B2-3779622 | 5/2006 |
| JP | B2-3779623 | 5/2006 |
| JP | B2-3779624 | 5/2006 |
| JP | A-2006-328416 | 12/2006 |

OTHER PUBLICATIONS

Partial Machine Translation of JP11-279274, A, Japan, 1999.*
Office Action issued in European Application No. 13001395.6 issued May 19, 2014.
Extended European Search Report issued in European Patent Application No. 13001395.6 dated Jul. 16, 2013.
Jul. 8, 2014 Japanese Office Action issued in Application No. 2012-081325 (with partial English translation).

* cited by examiner

Primary Examiner — Tae H Yoon
(74) Attorney, Agent, or Firm — Oliff PLC

(57) ABSTRACT

There is disclosed a polycarbonate and polysiloxane block copolymer includes 1 to 50 percent by mass of a siloxane portion derived from a polysiloxane block represented by the following formula (I) and 50 to 99 percent by mass of a carbonate portion derived from a polycarbonate block represented by the following formula (II). There can be provided a novel polycarbonate and polysiloxane block copolymer capable of readily imparting excellent flame retardance, and a flame retardant resin composition.

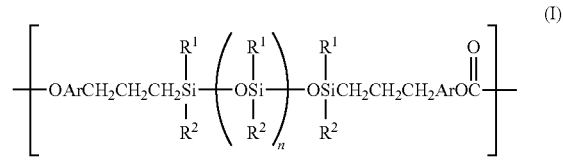

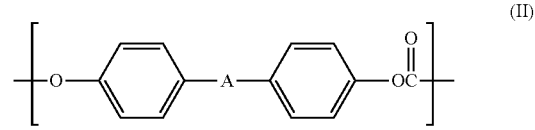

8 Claims, No Drawings

POLYCARBONATE AND POLYSILOXANE BLOCK COPOLYMER AND FLAME RETARDANT RESIN COMPOSITION

BACKGROUND OF THE INVENTION

1. Field of the Invention

The present invention relates to a polycarbonate and polysiloxane block copolymer, particularly a novel polycarbonate and polysiloxane block copolymer useful as an engineering thermoplastic resin, and a flame retardant resin composition containing the same.

2. Description of the Related Art

A copolymer having a polysiloxane block and a polycarbonate block, as disclosed in Patent Documents 1 and 2, can be obtained as a polycondensate from a dialkylpolysiloxane containing a phenolic hydroxyl group at both terminals, a bisphenol A and a carbonating agent. In fact, such a polycarbonate-based resin can provide excellent properties in low-temperature impact resistance and processability, but fails to provide sufficient flame retardance.

Meanwhile, Patent Documents 3 and 4 disclose methods for providing a flame-retardant polycarbonated copolymer comprising a brominated bisphenol A and a halogenated phenol. Nevertheless, these methods are undesirable due to the use of halides whose halogen, when combusted, is harmful to the environment and thus human health.

Furthermore, Patent Documents 5 to 7 disclose flame retardant polycarbonate resin compositions. In these methods, a phenyl group-containing hydrogenpolysiloxane is added to a thermoplastic polycarbonate resin to attain favorable flame retardance. Unfortunately, these methods involve such problems as the use of an expensive phenyl group-containing hydrogenpolysiloxane and unstable flame retardance resulting from a small amount thereof according to kneading conditions.

PRIOR ART DOCUMENT

Patent Document

Patent Document 1: Japanese Examined Patent Publication No. 8-32820
Patent Document 2: Japanese Patent Laid-Open Publication No. 6-100684
Patent Document 3: Japanese Patent Laid-Open Publications No. 6-298922
Patent Document 4: Japanese Patent Laid-Open Publications No. 6-336521
Patent Document 5: Japanese Patent No. 3779622
Patent Document 6: Japanese Patent No. 3779623
Patent Document 7: Japanese Patent No. 3779624

SUMMARY OF THE INVENTION

The present invention was made in view of the above situation, and has an object to provide a novel polycarbonate and polysiloxane block copolymer which is capable of readily imparting excellent flame retardance, and a flame retardant resin composition containing the same.

To solve the aforementioned problems, the present invention provides a polycarbonate and polysiloxane block copolymer comprising 1 to 50 percent by mass of a siloxane portion derived from a polysiloxane block represented by the following formula (I) and 50 to 99 percent by mass of a carbonate portion derived from a polycarbonate block represented by the following formula (II),

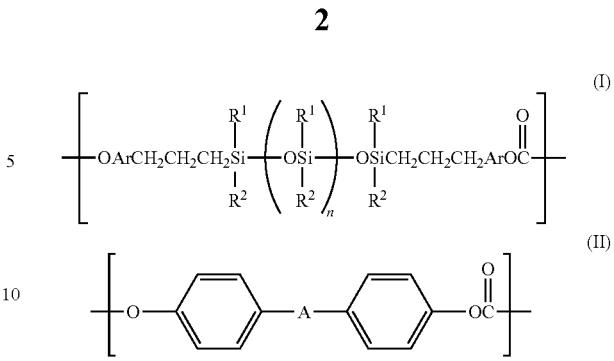

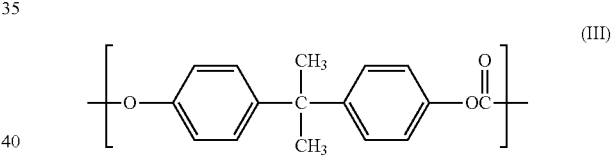

wherein, each of $R^1$ and $R^2$ independently represents an organic group selected from a methyl group, a phenyl group and a vinyl group, with at least one of all $R^1$s and $R^2$s representing a vinyl group; "n" is an integer of from 10 to 100; Ar represents a substituted or unsubstituted divalent aromatic group; A represents a group selected from a divalent hydrocarbon group having 1 to 3 carbon atoms, a halogenated hydrocarbon group having 1 to 3 carbon atoms, —S—, —SS—, —S(=O)—, —SO$_2$— and —O—.

The polycarbonate and polysiloxane block copolymer of the present invention can readily impart excellent flame retardance.

In this case, it is preferable that all $R^1$s and $R^2$s in the formula (I) contain 1 to 20% by mol of a vinyl group.

The vinyl group content from 1 to 20% by mol can provide a polycarbonate and polysiloxane block copolymer which is excellent in property from a drip preventing property.

Also, the polycarbonate block represented by the formula (II) is preferably a polycarbonate block represented by the following formula (III).

$$\left[ O - \underset{}{\bigcirc} - \underset{\underset{CH_3}{|}}{\overset{\underset{CH_3}{|}}{C}} - \underset{}{\bigcirc} - O\overset{O}{\underset{||}{C}} \right]$$ (III)

The polycarbonate block of the above formula (III) can contribute to imparting transparency in a more effective manner.

The present invention provides a flame retardant resin composition comprising (A) the polycarbonate and polysiloxane block copolymer.

The flame retardant resin composition of the present invention can be a flame retardant resin composition which can attain excellent flame retardance.

In this case, the flame retardant resin composition may further contain:

(B) an aromatic polycarbonate resin (one other than the component (A)); and (C) a flame retarder comprising any one selected from an alkali metal salt of an organic sulfonic acid, an alkaline earth metal salt of an organic sulfonic acid, a polytetrafluoroethylene, an organic phosphorous compound, and a halogen-phosphorus compound.

The flame retardant resin of the present invention can contain the above (B) and/or (C) components as required in view of transparency, impact resistance, more improved flame retardance and cost effectiveness.

The flame retardant resin composition contains 20 to 80 parts by mass of the component (A), 80 to 20 parts by mass of the component (B) and 0.01 to 5 parts by mass of the component (C).

This composition ratio can achieve more advantageous cost effectiveness and improve strength and transparency of a flame retardant resin composition.

As described above, the polycarbonate and polysiloxane block copolymer of the present invention has excellent flame retardance, particularly a favorable drip preventing property, as well as favorable impact resistance such as low-temperature impact resistance, and processability.

Thus, a flame retardant resin composition containing the polycarbonate and polysiloxane block copolymer of the present invention is excellent in transparency, impact resistance and flame retardance such as drip preventing property in a molded product.

Therefore, the polycarbonate and polysiloxane block copolymer of the present invention, and a flame retardant resin composition containing the same are significantly useful for various industrial applications such as OA equipment, electrical and electric equipment, lighting covers and building construction, leading to significantly higher industrial values.

DETAILED DESCRIPTION OF THE PREFERRED EMBODIMENTS

The present invention will be described in more detail.

As described above, conventional polycarbonate-based resins fail to provide favorable flame retardance and its improvement attempts involve some problems with operational safety and cost effectiveness.

As the result of extensive research to solve the problems described above, the present inventors found that, a polycarbonate and polysiloxane block copolymer comprising a siloxane portion and a carbonate portion, each having a specific structure, could solve the problems described above. Based on these findings, the present invention could be accomplished.

Accordingly, the polycarbonate and polysiloxane block copolymer of the present invention comprises 1 to 50 percent by mass of a siloxane portion derived from a polysiloxane block represented by the following formula (I) and 50 to 99 percent by mass of a carbonate portion derived from a polycarbonate block represented by the following formula (II).

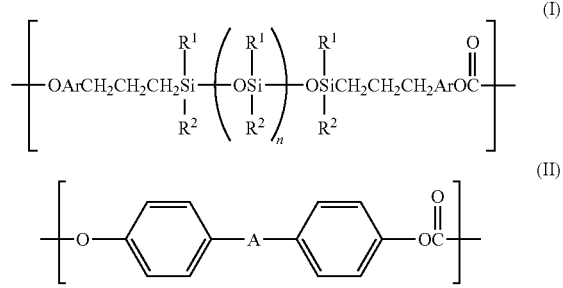

In the above formula (I), $R^1$ and $R^2$ independently represent an organic group selected from a methyl group, a phenyl group and a vinyl group, with at least one of all $R^1$s and $R^2$s containing a vinyl group. Each of $R^1$ independently represents an organic group selected from a methyl group, a phenyl group and a vinyl group, and each of $R^2$ independently represents an organic group selected from a methyl group, a phenyl group and a vinyl group.

The vinyl group imparts, when combusted, excellent flame retardance, particularly an excellent drip preventing property. In fact, a conventional polycarbonate and polysiloxane copolymer is known as a flame retardant aromatic polycarbonate-based resin having an excellent impact resistance. The conventional polycarbonate and polysiloxane copolymer uses a both-terminal phenolic hydroxyl group-containing dialkylpolysiloxane which employs a saturated hydrocarbon group or a phenyl group as an alkyl group. However, there is no polycarbonate and polysiloxane copolymer containing a vinyl group.

It is preferable that all $R^1$s and $R^2$s contain 1 to 20% by mol of a vinyl group. A vinyl group content of 1% by mol or more shows an excellent drip preventing property, and a vinyl group content of 20% by mol or less can reduce the cost and readily produce a block copolymer.

The degree of polymerization (n: number of repeating unit of siloxane) is an integer of from 10 to 100, preferably an integer of from 20 to 80. A degree of polymerization (n) of under 10 shows an insufficient ability to impart impact resistance, and an n of over 100 can damage transparency of a polycarbonate and polysiloxane block copolymer (polycarbonate-based resin).

Ar represents a substituted or unsubstituted divalent aromatic group.

Specific examples of the Ar include a phenylene group, a methylphenylene group, an ethylphenylene group and a methoxyphenylene group, and the phenylene group or an O-methoxyphenylene group is particularly preferable.

In the above formula (II), A is a group selected from a divalent hydrocarbon group having 1 to 3 carbon atoms, a halogenated hydrocarbon group having 1 to 3 carbon atoms, —S—, —SS—, —S(=O)—, —SO$_2$— and —O—, and preferably a divalent organic group or a divalent atom selected from —CH$_2$—, —C(CH$_3$)$_2$—, —C(CF$_3$)$_2$—, —S—, —S(=O)—, —SO$_2$— and —O—.

In particular, the polycarbonate block represented by the above formula (II) is preferably a polycarbonate block represented by the following formula (III).

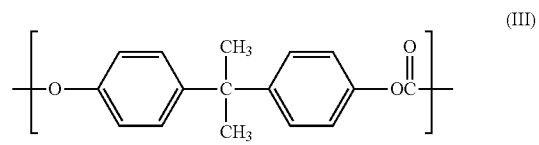

The ratio of a siloxane portion derived from a polysiloxane block of the above formula (I) to a carbonate portion derived from a polycarbonate block of the above formula (II) is 1 to 50 percent by mass/99 to 50 percent by mass. A ratio of under 1 percent by mass of the siloxane portion shows insufficient flame retardance and impact resistance, and a ratio of over 50 percent by mass thereof leads to unfavorable strength and transparency. Moreover, a ratio of 2 to 30 percent by mass/98 to 70 percent by mass is preferable in order to attain flame retardance, impact resistance and processability in a well-balanced manner.

(Production Method)

The polycarbonate and polysiloxane block copolymer of the present invention is produced, e.g. by interfacial polymerization of carbonate precursors such as phosgene and diphenylcarbonate, a both-terminal phenolic hydroxyl group-containing diorganopolysiloxane of the following formula (IV), a divalent phenol of the following formula (V) and a monovalent phenol whose amount limits the chain length,

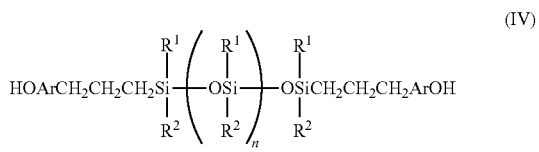

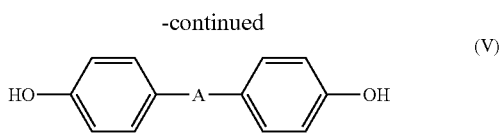

(V)

wherein, $R^1$, $R^2$, Ar, n and A represent the same meanings as before.

Specific examples of the ArOH of the above formula (IV) include an O-hydroxyphenyl group, a p-hydroxyphenyl group and a p-hydroxy-o-methoxyphenyl group, and the O-hydroxyphenyl group or the p-hydroxy-o-methoxyphenyl group is particularly preferable.

The siloxane of the above formula (IV) is produced, e.g. by equilibration reaction from an addition product consisting of a phenolic hydroxyl group-containing an allyl compound and an H—Si($R^1R^2$)OSi($R^1R^2$)—H, and an ($R^1R^2$SiO)m, wherein "m" is an integer of from 3 to 8.

A siloxane portion in the polycarbonate and polysiloxane block copolymer of the present invention contains a vinyl group in at least one of all $R^1$s and $R^2$s in the above formula (I). To introduce a vinyl group in $R^1$ and/or $R^2$, examples of the ($R^1R^2$SiO)m in the above equilibration reaction include an octamethylcyclotetrasiloxane, a decamethylcyclopentasiloxane, a hexamethyltrisiloxane, a triphenyltrimethylcyclotrisiloxane, a hexaphenylcyclotrisiloxane, a 1,1,3,3-tetramethyl-5,5-diphenyl-cyclotrisiloxane and an octaphenylcyclotetrasiloxane. Moreover, a tetramethyltetravinylcyclotetrasiloxane, a 1,1,3,3,5-pentamethyl-5-vinyl-cyclotrisiloxane, a 1,3,5-trimethyl-1,3,5-trivinyl-cyclotrisiloxane and a 1,3,5,7-tetramethyl-1,3,5,7-tetravinyl-cyclotetrasiloxane may be used in combination therewith.

The polycarbonate block of the present invention (the above formula (II)) can be produced from the divalent phenol of the above formula (V) as an ingredient, and specific compounds of the above formula (V) include bis(4-hydroxyphenyl)methane and bisphenol A.

The polycarbonate and polysiloxane block copolymer of the present invention can be produced by reacting the polysiloxane represented by the above formula (IV) and the divalent phenol represented by the above formula (V) with carbonate precursors such as phosgene and diphenylcarbonate. In general, the polycarbonate and polysiloxane block copolymer of the present invention can be produced by dissolving or dispersing a diphenol reactant into a caustic water solution, adding an obtained mixture to a suitable water-immiscible solvent (e.g. methylene chloride) and making contact with phosgene in the presence of a catalyst.

Examples of the carbonate precursor except for a phosgene include a diphenylcarbonate, a 2,2-bis(4-hydroxyphenyl)propane, bishaloformates such as 2,2-bis(hydroxy-3,5-dichlorophenol)propane, a hydroquinone and an ethylene glycol-bishaloformate.

(Flame Retardant Resin Composition)

The present invention provides a flame retardant composition comprising the polycarbonate and polysiloxane block copolymer of the present invention produced in the above manner as component (A).

Since the novel polycarbonate and polysiloxane block copolymer (component (A)) of the present invention contains an appropriate level of a vinyl group in itself, the vinyl group is subjected to radical polymerization, when combusted, to impart excellent flame retardance, particularly a favorable drip preventing property.

In addition, in view of transparency, impact resistance, more improved flame retardance and cost effectiveness, a thermoplastic aromatic polycarbonate resin (component (B)) other than component (A) can be blended with the polycarbonate and polysiloxane block copolymer of the present invention. Under the circumstances, a small amount of a flame retarder (component (C)) can be mixed with a thermoplastic polycarbonate-based resin comprising the components (A) and (B) to impart more stable flame retardance.

Examples of a flame retarder used include an alkali metal salt of an organic sulfonic acid, an alkaline earth metal salt of an organic sulfonic acid, a polytetrafluoroethylene, an organic phosphorous compound and a halogenphosphorus compound, and the alkali metal salt of the organic sulfonic acid is preferable. Specific examples of the organic sulfonic acidalkali metal salt include a benzenesulfonate potassium salt, a diphenylsulfonate potassium salt, a trifluoromethanesulfonate potassium salt, a nonafluorobutanesulfonate potassium salt, and the nonafluorobutanesulfonate potassium salt is particularly preferable.

The aromatic polycarbonate resin of the component (B) used in the present invention is not particularly limited if it is a generally available material.

As the blending ratio of component (A) to (C), it is preferable that component (A) be 20 to 80 parts by mass, component (B) be 80 to 20 parts by mass and component (C) be 0.01 to 5 parts by mass.

In blending the components (A) and (B), 20 parts by mass or more of the component (A) increases the content of the flame retarder and cost effectiveness, while 20 parts by mass or more of the component (B) is advantageous due to improved strength and transparency.

0.01 parts by mass or more of the flame retarder of the component (C) can further stabilize flame retardance. Even though a flame retarder is blended accordingly, however, a blending ratio of 5 parts by mass can sufficiently attain sufficient flame retardance, thereby requiring no additional blending and providing more advantageous cost effectiveness.

An additive agent, which is known as plastic compounding, can be added to the flame retardant resin composition of the present invention as another component. Examples of the additive agent include fillers such as clay and talc, reinforcing agents such as glass fiber and silica, impact resistance improving agents, antistatic agents, plasticizers, flow promoters, stabilizers, coloring agents, releasing agents, ultraviolet absorbers.

Optional methods are introduced to produce the flame retardant resin composition of the present invention. For instance, components (A) to (C) and other optional components are sufficiently mixed using pre-mixing means such as V-shaped blender, Henschel mixer, mechanochemical apparatuses and extrusion blender, and granulated using pellet mill and briquetting machine. Afterward, the mixture is subjected to melt kneading with a melt kneader, particularly vent-type twin-screw extruders, and to pelletizing using a palletizer.

Other methods include those for feeding the components (A) to (C) and other optional components into a melt kneader, particularly a vent-type twin-screw extruder, and those for pre-mixing part of the components (B) and (C) and independently melt-kneading with remaining components. If a blended component is in the form of liquid, it can be fed into a melt kneader using a liquid solution discharge device or a liquid adding apparatus.

The flame retardant resin composition of the present invention can be produced by injection-molding pellets under normal conditions to obtain a molded product. The resin composition of the present invention is provided with a high thermal stability during high-temperature melting such as injection molding.

In the injection molding, not only a normal cold-liner molding method, but also a hot liner that enables linerless operation can be used to mold pellets. Also, in addition to the normal molding method, a gas-assisted injection molding, an injection compression molding and an ultra-high speed injection molding can be introduced.

The flame retardant resin composition of the present invention can be used in the form of each contour extrusion molded product by extrusion molding, sheet or film. A sheet or film is molded using inflation process or casting process, etc. A sheet or film can be molded into a heat shrinkable tube by a specific drawing. A molded product can be provided, without melt-kneading the flame retardant resin composition of the present invention, but using rotational molding it.

EXAMPLES

The present invention will be described in more detail with reference to examples and comparative examples, but the present invention is not limited to the following examples.

Preparation Example 1-1

After a material represented by the following formula (VI) (46.2 g),

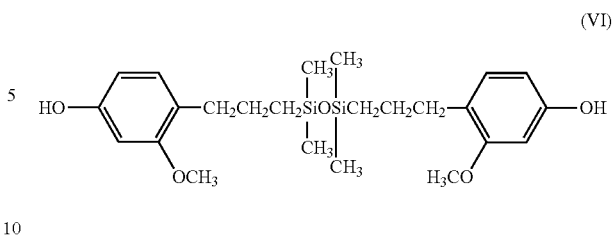
(VI)

octamethylcyclotetrasiloxane (296 g) and 1,3,5,7-tetravinyl-1,3,5,7-tetramethylcyclotetrasiloxane (40.5 g) were equally mixed, trifluoromethanesulfonic acid (3.8 g) was added thereto at 25° C. and the product was equally agitated at 25 to 35° C. for 15 hours. Afterward, sodium carbonate (20 g) was added thereto for neutralization for one hour, and unreacted compounds were removed by distillation under reduced pressure at 120° C. after filtration to obtain a desired product represented by the following formula (VII).

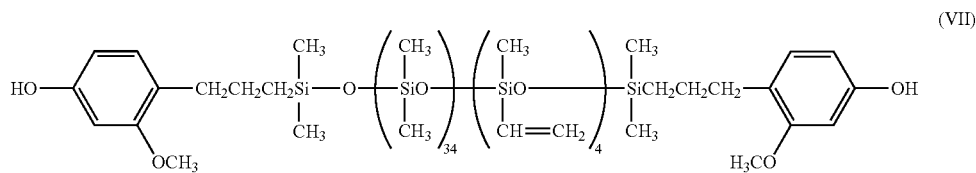
(VII)

Preparation Example 1-2

After a material represented by the above formula (VI) (46.2 g), octamethylcyclotetrasiloxane (261 g) and 1,3,5,7-tetravinyl-1,3,5,7-tetramethylcyclotetrasiloxane (80.9 g) were equally mixed, trifluoromethanesulfonic acid (3.9 g) was added thereto at 25° C. and equally agitated at 25 to 35° C. for 15 hours. Afterward, sodium carbonate (20 g) was added thereto for neutralization for one hour, and unreacted compounds were removed by distillation under reduced pressure at 120° C. after filtration to obtain a desired product represented by the following formula (VIII).

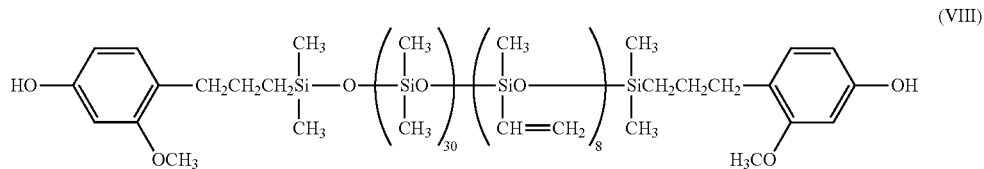
(VIII)

Preparation Example 2-1

907 parts by mass of bisphenol A, 60 parts by mass of polysiloxane obtained in Preparation example 1-1, triethylamine (10 ml), 14 parts by mass of phenol and 1.5 parts by mass of sodium gluconate were mixed in 2 parts by mass of water and dichloromethane (2.5 L). The two-phase mixture was strongly agitated, and 50% sodium hydroxide solution was added thereto to adjust pH to 10. While the pH was maintained from 10.0 to 10.5, 453 parts by mass of phosgene was added thereto, and a reaction mixture was purged with nitrogen, thereby adding dichloromethane (2 L) thereto to separate an organic phase from a salt-water phase.

The organic phase washed with a 1% hydrochloric acid solution and a polycarbonate and polysiloxane copolymer dissolved in a dichloromethane solution were precipitated with steam to isolate a siloxane and polycarbonate block copolymer [PC-1] as a white resin. By drying the product, 950 parts by mass of a copolymer PC-1 was obtained.

The polysiloxane content was 7 percent by mass using 1H-NMR on condition that Mw=23,500, Mn=10,000 and 14 g/10 min. of melt flow rate (converted to polystyrene by GPC of PC-1).

Preparation Example 2-2

920 parts by mass of a polycarbonate and polysiloxane block copolymer [PC-2] was isolated only on condition that polysiloxane of Preparation example 1-1 is replaced by polysiloxane of Preparation example 1-2.

The polysiloxane content was 6 percent by mass using 1H-NMR on condition that Mw=23,000, Mn=10,100 and 15 g/10 min. of melt flow rate (converted to polystyrene by GPC of PC-2).

<Molding of Test Specimen>

Each component in Table 1 was weighed, equally mixed with a tumbler and fed into the extruder.

In examples and comparative examples, component (B) was TARFLON A-2500 (linear PC: product from Idemitsu Kosan Co., Ltd.), C-1 in component (C) was Megafac F-114P (C4F9SO3K: product from DIC Corporation), and C-2 in component (C) was Polyflon MPA FA500 (PTFE powder: product from Daikin Industries Ltd.).

The extruder used was a vent-type twin-screw extruder, 30 mm in diameter (KTX-30: product from Kobe Steel., Ltd.). The screw is composed of a first kneading zone before a vent position, made up of 2 feeding kneading discs, one feeding rotor, one returning rotor and one returning kneading disc, and a second kneading zone after the vent position, made up of one feeding rotor and one returning rotor. Strands were extruded on condition that cylinder temperature and die temperature was 280° C. and the degree of vent suctioning was 3,000 Pa. After the product was cooled with water, it was cut into strands with a palletizer to prepare pellets. The pellets obtained were dried at 110° C. for 5 hours with a hot air circulation drying machine, and test specimens were molded with an injection molding machine [T-150D: product from Fanuc Corporation] on condition that the cylinder temperature was 290° C. and the mold temperature was 70° C.

TABLE 1

|   |   |   | Example1 | Example2 | Example3 | Example4 |
|---|---|---|---|---|---|---|
| Ratio | Component (A) | PC-1 | 80 | — | 40 | — |
|   |   | PC-2 | — | 80 | — | 40 |
|   | Component (B) |   | 20 | 20 | 60 | 60 |
|   | Component (C) | C-1 | — | — | — | — |
|   |   | C-2 | — | — | — | — |

|   |   |   | Example5 | Example6 | Comparative Example1 | Comparative Example2 |
|---|---|---|---|---|---|---|
| Ratio | Component (A) | PC-1 | 40 | — | — | — |
|   |   | PC-2 | — | 40 | — | — |
|   | Component (B) |   | 60 | 60 | 100 | 100 |
|   | Component (C) | C-1 | 0.2 | — | — | — |
|   |   | C-2 | — | 0.5 | — | 0.5 |

The following items were evaluated.

<Material Property>

(1) Flame Retardance

Test specimens (1.6 mm in thickness) were prepared from the test specimens molded as above in compliance with UL standards. The test specimens prepared as above were examined in compliance with UL standard 94. Based on the results, the test specimens were ranked as V-0, V-1 or V-2 according to the criteria as shown in Table 2. The results are shown in Table 3.

TABLE 2

|   | V-0 | V-1 | V-2 |
|---|---|---|---|
| Afterflame time in each material | 10 sec. or less | 30 sec. or less | 30 sec. or less |
| Total afterflame time in 5 materials | 50 sec. or less | 250 sec. or less | 250 sec. or less |
| Fire on cotton by drip | None | None | Found |

(2) Impact Resistance

The test specimens molded as above were evaluated by Charpy impact strength (KJ/m$^2$) in compliance with JIS K-7111. The results are shown in Table 3.

TABLE 3

|   |   | Example 1 | Example 2 | Example 3 | Example 4 |
|---|---|---|---|---|---|
| Evaluation | Flame retardance | V-0 | V-0 | V-1 | V-1 |
|   | Impact resistance | 90 | 90 | 90 | 90 |

|   |   | Example 5 | Example 6 | Comparative Example 1 | Comparative Example 2 |
|---|---|---|---|---|---|
| Evaluation | Flame retardance | V-0 | V-0 | V-2 | V-2 |
|   | Impact resistance | 85 | 85 | 80 | 80 |

As shown in Table 3, the flame retardant resin compositions, which comprise the polycarbonate and polysiloxane block copolymer of the present invention as a main component (Examples 1 to 6), exhibit excellent flame retardance and favorable drip preventing property due to a proper level of a vinyl group content on a side chain, and flexibility derived from dialkylpolysiloxane is imparted, resulting in an excellent impact resistance. Moreover, these flame retardant resin compositions are excellent in transparency as well.

Meanwhile, Comparative Examples 1 and 2 also show an excellent transparency, but they fail to attain sufficient flame retardance, whose resulting drip leads to deteriorated impact resistance.

It must be stated here that the present invention is not restricted to the embodiments shown by Examples. The embodiments shown by Examples are merely examples so that any embodiments composed of substantially the same technical concept as disclosed in the claims of the present invention and expressing a similar effect are included in the technical scope of the present invention.

What is claimed is:

1. A molded product comprising a molded flame retardant resin composition which comprises (A) a polycarbonate and polysiloxane block copolymer comprising 1 to 50 percent by mass of a siloxane portion derived from a polysiloxane block represented by the following formula (I) and 50 to 99 percent by mass of a carbonate portion derived from a polycarbonate block represented by the following formula (II),

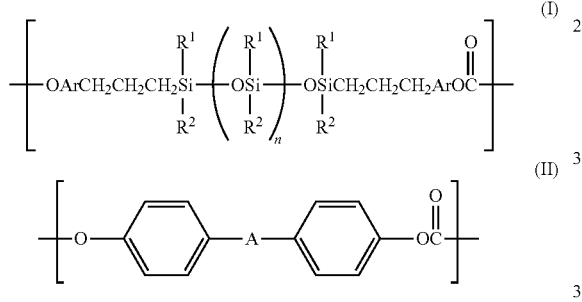

wherein, each of $R^1$ and $R^2$ independently represent an organic group selected from a methyl group, a phenyl group and a vinyl group;
1 to 20% by mol of the $R^1$ and $R^2$ groups in the copolymer are vinyl groups;
"n" represents an integer of from 10 to 100;
Ar represents a divalent aromatic group, which may be substituted by a methyl group, an ethyl group, or a methoxy group; and
A represents a group selected from a divalent hydrocarbon group having 1 to 3 carbon atoms, a halogenated hydrocarbon group having 1 to 3 carbon atoms, —S—, —SS—, —S(=O)—, —SO$_2$— and —O—.

2. The molded product according to claim 1, wherein the polycarbonate block represented by the formula (II) is a polycarbonate block represented by the following formula (III),

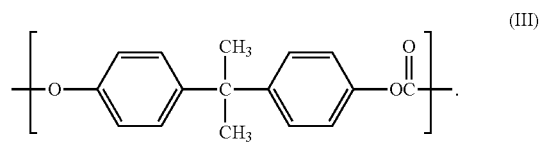

3. The molded product according to claim 1, wherein the flame retardant resin composition further comprises:
(B) an aromatic polycarbonate resin other than the component (A); and
(C) a flame retarder selected from an alkali metal salt of an organic sulfonic acid, an alkaline earth metal salt of an organic sulfonic acid, a polytetrafluoroethylene, an organic phosphorous compound and a halogen-phosphorus compound.

4. The molded product according to claim 2, wherein the flame retardant resin composition further comprises:
(B) an aromatic polycarbonate resin other than the component (A); and
(C) a flame retarder selected from an alkali metal salt of an organic sulfonic acid, an alkaline earth metal salt of an organic sulfonic acid, a polytetrafluoroethylene, an organic phosphorous compound and a halogen-phosphorus compound.

5. The molded product according to claim 3, wherein the flame retardant resin composition contains 20 to 80 parts by mass of the component (A), 80 to 20 parts by mass of the component (B) and 0.01 to 5 parts by mass of the component (C).

6. The molded product according to claim 4, wherein the flame retardant resin composition contains 20 to 80 parts by mass of the component (A), 80 to 20 parts by mass of the component (B) and 0.01 to 5 parts by mass of the component (C).

7. The molded product according to claim 1, wherein 1 to 10% by mol of the $R^1$ and $R^2$ groups in the copolymer are vinyl groups.

8. The molded product according to claim 1, wherein a form of the molded product is sheet or film.

* * * * *